(12) United States Patent
Arisi et al.

(10) Patent No.: US 11,939,883 B2
(45) Date of Patent: Mar. 26, 2024

(54) AIRFOIL WITH ARCED PEDESTAL ROW

(71) Applicant: United Technologies Corporation, Farmington, CT (US)

(72) Inventors: Allan N. Arisi, Manchester, CT (US); Ricardo Trindade, Mansfield, CT (US); Dominic J. Mongillo, West Hartford, CT (US); Tracy A. Propheter-Hinckley, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 583 days.

(21) Appl. No.: 16/532,603

(22) Filed: Aug. 6, 2019

(65) Prior Publication Data
US 2020/0149415 A1 May 14, 2020

Related U.S. Application Data

(60) Provisional application No. 62/758,074, filed on Nov. 9, 2018.

(51) Int. Cl.
*F01D 5/18* (2006.01)

(52) U.S. Cl.
CPC .... *F01D 5/188* (2013.01); *F05D 2260/22141* (2013.01)

(58) Field of Classification Search
CPC ...................... F01D 5/188; F01D 5/187; F05D 2260/22141; F05D 2250/71; F05D 2240/127; F05D 2240/304; F05D 2240/122; Y02T 50/60
See application file for complete search history.

(56) References Cited

U.S. PATENT DOCUMENTS

| 6,939,107 B2 | 9/2005 | Mongillo, Jr. et al. |
| 7,121,787 B2 | 10/2006 | Jacks et al. |
| 7,377,748 B2 | 5/2008 | Mongillo, Jr. et al. |

(Continued)

FOREIGN PATENT DOCUMENTS

| EP | 1467065 | 10/2004 |
| EP | 2692991 | 2/2014 |

(Continued)

OTHER PUBLICATIONS

European Search Report for European Patent Application No. 19208383.0 dated Dec. 19, 2019.

*Primary Examiner* — Jacob M Amick
*Assistant Examiner* — Charles J Brauch
(74) *Attorney, Agent, or Firm* — Carlson, Gaskey & Olds, P.C.

(57) ABSTRACT

An airfoil includes an airfoil section that has an airfoil wall that defines a leading end, an arced trailing end, and first and second sides that join the leading end and the arced trailing end. The first and second sides span in a longitudinal direction between first and second ends. The airfoil wall circumscribes an internal core cavity that includes an exit region that spans between the first and second ends and that opens through the arced trailing end. The exit region includes pedestals arranged in a plurality of longitudinal pedestal rows. At least one of the longitudinal pedestal rows is straight and at least one of the longitudinal pedestal rows is arced.

20 Claims, 4 Drawing Sheets

(56) References Cited

U.S. PATENT DOCUMENTS

| | | | | |
|---|---|---|---|---|
| 2013/0323079 A1* | 12/2013 | Martin | ................... | F01D 5/186 |
| | | | | 416/97 R |
| 2016/0069189 A1* | 3/2016 | Quach | ................... | F01D 5/284 |
| | | | | 416/241 B |
| 2016/0222824 A1 | 8/2016 | Gersbach et al. | | |

FOREIGN PATENT DOCUMENTS

| | | | | |
|---|---|---|---|---|
| EP | 2692991 A1 * | 2/2014 | ............. | F01D 5/187 |
| JP | 2009287511 | 12/2009 | | |

* cited by examiner

AIRFOIL WITH ARCED PEDESTAL ROW

CROSS-REFERENCE TO RELATED APPLICATION

This application claims priority to United States Provisional Application No. 62/758,074 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines a leading end, an arced trailing end, and first and second sides that join the leading end and the arced trailing end. The first and second sides span in a longitudinal direction between first and second ends. The airfoil wall circumscribes an internal core cavity. The internal core cavity has an exit region that spans between the first and second ends and that opens through the arced trailing end. The exit region includes pedestals arranged in a plurality of longitudinal pedestal rows. At least one of the longitudinal pedestal rows is straight and at least one of the longitudinal pedestal rows is arced.

In a further embodiment of any of the foregoing embodiments, the at least one of the longitudinal pedestal rows that is straight includes a plurality of longitudinal pedestal rows that are straight, and the at least one of the longitudinal pedestal rows that is arced includes a plurality of longitudinal pedestal rows that are arced.

A further embodiment of any of the foregoing embodiments includes a redistribution region that has a plurality of non-flow-metering pedestals between the plurality of longitudinal pedestal rows that are straight and the plurality of longitudinal pedestal rows that are arced.

In a further embodiment of any of the foregoing embodiments, the airfoil section defines a span from the first end to the second end, and the redistribution region is within a middle 80% of the span.

A further embodiment of any of the foregoing embodiments includes a redistribution region that has an array of redistribution region pedestals that define a first intra-pedestal cross-sectional flow area. The plurality of longitudinal pedestal rows that are straight defines a second intra-pedestal cross-sectional flow area that is different than the first intra-pedestal cross-sectional flow area.

In a further embodiment of any of the foregoing embodiments, the first intra-pedestal cross-sectional flow area is greater than the second intra-pedestal cross-sectional flow area.

In a further embodiment of any of the foregoing embodiments, the plurality of longitudinal pedestal rows that are arced have congruent radii of curvature.

In a further embodiment of any of the foregoing embodiments, the at least one of the longitudinal pedestal rows that is arced includes a plurality of longitudinal pedestal rows that are arced, and the plurality of longitudinal pedestal rows that are arced each have a unique radius of curvature.

In a further embodiment of any of the foregoing embodiments, the unique radii of curvature decrease serially toward the trailing end of the airfoil section.

In a further embodiment of any of the foregoing embodiments, the unique radii of curvature decrease serially by an equal increment toward the trailing end of the airfoil section.

In a further embodiment of any of the foregoing embodiments, an aft-most one of the longitudinal pedestal rows that are arced is congruent with the arced trailing end.

In a further embodiment of any of the foregoing embodiments, the at least one of the longitudinal pedestal rows that is arced is congruent with the arced trailing end.

A gas turbine engine according to an example of the present disclosure includes a compressor section, a combustor in fluid communication with the compressor section, and a turbine section in fluid communication with the combustor. The turbine section has a turbine airfoil according to any of the foregoing embodiments.

In a modified example of the airfoil according to the present disclosure, the plurality of longitudinal pedestal rows have an aft-most pedestal row that is arced and congruent with the arced trailing end.

In a further embodiment of any of the foregoing embodiments, the plurality of longitudinal pedestal rows includes at least one longitudinal pedestal row that is straight and longitudinal pedestal rows that are arced, and the longitudinal pedestal rows that are arced each have a unique radius of curvature.

In a further embodiment of any of the foregoing embodiments, the unique radii of curvature decrease serially toward the trailing end of the airfoil section.

A further embodiment of any of the foregoing embodiments includes a redistribution region that has an array of redistribution region pedestals that define a first intra-pedestal cross-sectional flow area. The at least one longitudinal pedestal row that is straight defines a second intra-pedestal cross-sectional flow area that is different than the first intra-pedestal cross-sectional flow area.

In a further embodiment of any of the foregoing embodiments, the airfoil section defines a span from the first end to the second end, and the redistribution region is within a middle 80% of the span.

In a further embodiment of any of the foregoing embodiments, the first intra-pedestal cross-sectional flow area is greater than the second intra-pedestal cross-sectional flow area.

In a further embodiment of any of the foregoing embodiments, the plurality of longitudinal pedestal rows includes at least one longitudinal pedestal row that is straight.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
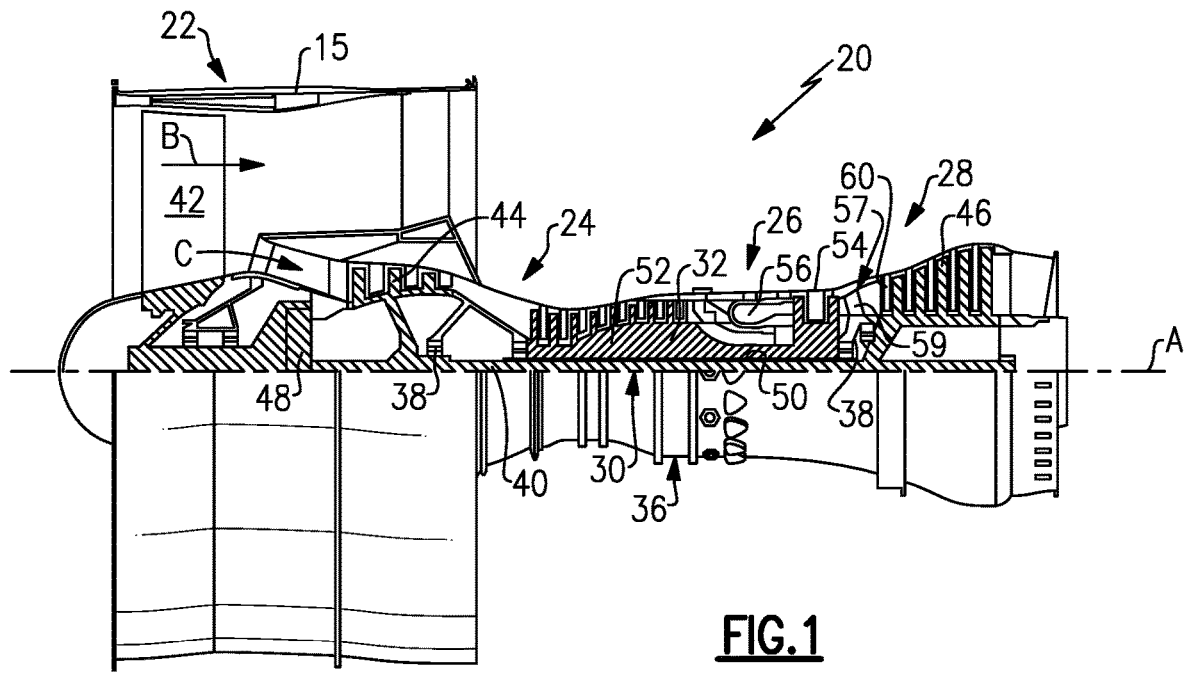
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
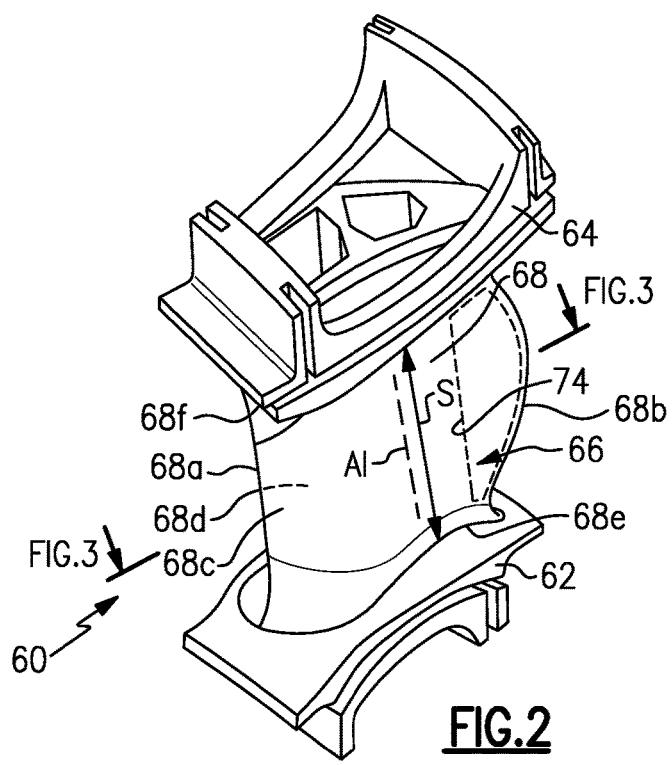
FIG. 2 illustrates an example turbine airfoil.
Figure 3:
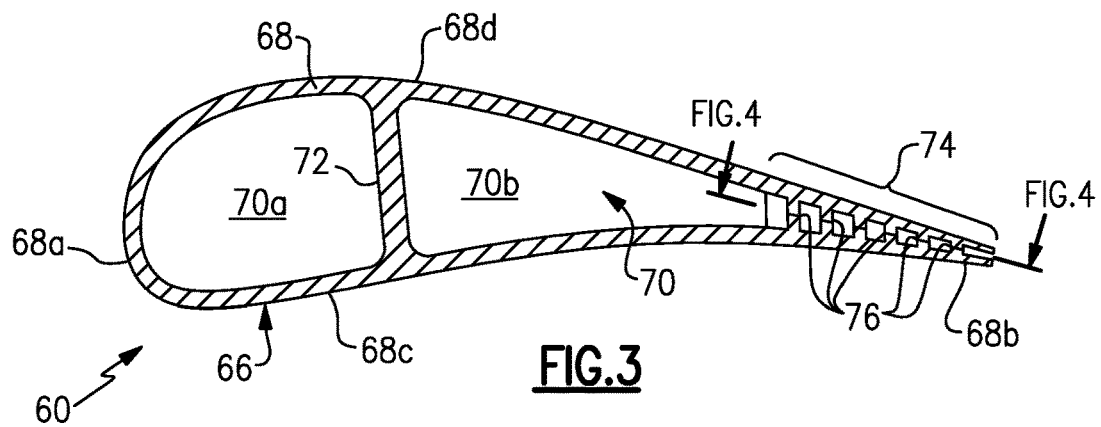
FIG. 3 illustrates a sectioned view of the airfoil of FIG. 2.

FIG. 2 illustrates a representative example of a turbine airfoil 60 used in the turbine engine 20 (see also FIG. 1), and FIG. 3 illustrates a sectioned view of the airfoil 60. As shown, the turbine airfoil 60 is a turbine vane; however, it is to be understood that, although the examples herein may be described with reference to the turbine vane, this disclosure is also applicable to turbine blades.

The turbine airfoil 60 includes an inner or first platform 62, an outer or second platform 64, and an airfoil section 66 that spans in a longitudinal direction A1 (which is also a radial direction relative to the engine central axis A) between the first and second platforms 62/64. Terms such as "radially," "axially," or variations thereof are used herein to designate directionality with respect to the engine central axis A.

The airfoil section 66 includes an airfoil outer wall 68 that delimits the profile of the airfoil section 66. The outer wall 68 defines a leading end 68a, an arced trailing end 68b, and first and second sides 68c/68d that join the leading and trailing ends 68a/68b. The first and second sides 68c/68d span in the longitudinal direction between first and second ends 68e/68f. The first and second ends 68e/68f are attached, respectively, to the first and second platforms 62/64. In this example, the first side 68c is a pressure side and the second side 68d is a suction side. As shown in FIG. 3, the outer wall 68 circumscribes an internal core cavity 70. In this example, the airfoil section 66 includes a rib 72 that extends from the first side 68c to the second side 68d and partitions the cavity 70 into a forward core cavity 70a and an aft core cavity 70b.

During operation, cooling air, such as bleed air from the compressor 24, is provided from one of the platforms 62/64 into the internal core cavity 70 to cool the airfoil section 66. The internal core cavity 70 includes an exit region 74 through which the cooling air is discharged into the core gaspath. The exit region 74 spans between the first and second ends 68e/68f and opens through the arced trailing end 68b. The exit region 74 includes a plurality of pedestals 76 that serve to facilitate heat transfer to cool the airfoil section 66. It is to be appreciated that although the pedestals 76 may be illustrated as being circular in nature, they may comprise of alternative geometry shapes and sizes that are non-circular in nature. Such pedestal feature shapes may include, but are not limited to; elliptical, oblong, teardrop, multi-faceted geometries comprising of both concave and/or convex surface curvatures.

Figure 4:
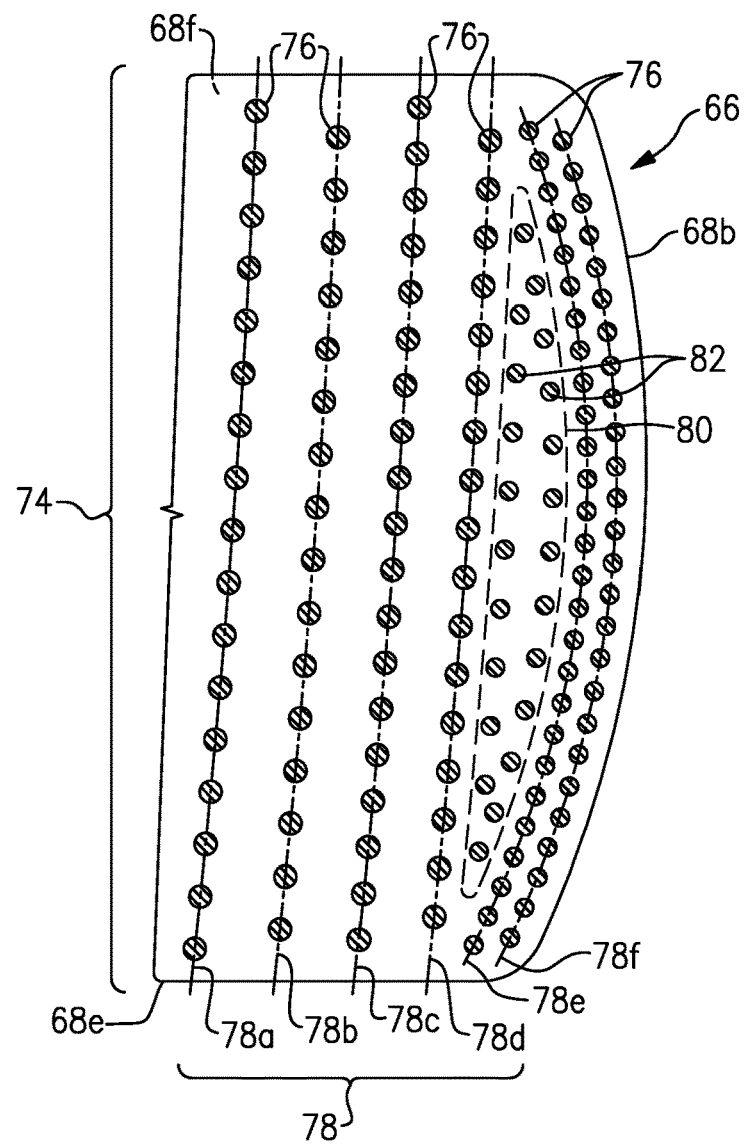
FIG. 4 illustrates a sectioned view of the airfoil of FIG. 2.

FIG. 4 illustrates a sectioned view through the pedestals 76. The pedestals 76 are arranged in a plurality of longitudinal rows 78a/78b/78c/78d/78e/78f (collectively rows 78). As used herein, a "row" refers to a group of the pedestals 76 that are aligned along a straight line or a continuous arc. In some embodiments, the pedestal rows also have a common intra-pedestal spacing, i.e., the distance between adjacent pedestals in both the longitudinal (lateral) and streamwise (row-to-row) spacing that is are equidistant and/or equivalent, creating and equilateral triangle. At least one of the pedestals rows 78 is straight and at least one of the rows 78 is arced. In this example, rows 78a/78b/78c/78d are straight and rows 78e/78f are arced. The straight rows 78a/78b/78c/78d are parallel or substantially parallel to the longitudinal axis A1.

The rows 78e/78f that are arced each have a radius of curvature. In one example, the radii of curvature are congruent (i.e., equal). In a further example, the arced trailing end 68b also has a radius of curvature and the radii of curvature of the rows 78e/78f are congruent with the radius of curvature of the arced trailing end 68b. In other embodiments, depending on the relative orientation of the first and second platforms 62/64, the radius of curvature of the rows 78e/78f may not necessarily be congruent. For example, in instances where the platforms 62/64 are either converging and/or diverging, the radius of curvature between any two adjacent successive pedestal rows 78 along the streamwise direction of the cooling airflow may not necessarily be congruent. The pedestals 76 of the straight rows 78a/78b/78c/78d are longitudinally staggered, and the pedestals 76 of the arced rows 78e/78f are longitudinally staggered. As will be appreciated, the rows 78 may include fewer straight rows or additional straight rows, and the rows 78 may include fewer arced rows or additional arced rows.

The use of both straight and arced rows 78 facilitates distribution of the cooling air in the exit region 74. In particular, the arced trailing end 68b challenges the arrangement of pedestals to obtain even flow. For instance, if all straight rows were used, the rows near the arced trailing end 68b would have to be longitudinally shorter to fit inside the arced profile of the arced trailing end 68b, thereby creating flow discontinuities that would tend to unevenly longitudinally distribute more of the cooling air toward the ends 68e/68f than through the middle and/or mid span region of the airfoil trailing end 68b. Similarly, if all arced rows were used, the forward-most row or rows would create an arced boundary to the open portion of the internal core cavity 70, which again would create flow discontinuities that would tend to unevenly longitudinally redistribute the cooling air. Alternatively, the forward-most arced row or rows could be longitudinally shorter. However, there would then be more pedestals in the middle span of the airfoil, thereby again creating flow discontinuities that would tend to unevenly longitudinally (laterally) redistribute more of the cooling air toward the ends 68e/68f than through the middle. In this regard, as discussed further below, the airfoil 60 includes both straight and arced rows 78 in combination with a redistribution region 80 that facilitates a more uniform longitudinal distribution of the cooling air flow upstream of arced pedestal rows 78e and 78f.

The redistribution region 80 includes an array (within the dashed line at 80) of distribution region pedestals 82. The redistribution pedestals 82 may be arranged in multiple rows, which may be straight or arced, and the rows may be longitudinally staggered. The redistribution region 80 may be located between the straight rows 78a/78b/78c/78d and the arced rows 78e/78f. The redistribution region 80 may also be located in the mid-span of the airfoil section 66. For instance, the airfoil section 66 defines a span, represented at S in FIG. 2, from the first end 68e to the second end 68f, and the redistribution region 80 is within a middle 80% of the span S.

Although FIG. 4 illustrates the axial location/position of the redistribution region 80 upstream of two pedestal rows 78e and 78f, the relative location of the redistribution region 80 may alternatively be located at the beginning or inlet to the pedestal array located in the exit region 74 within the trailing edge of the airfoil 60. Additionally the redistribution region 80 may be located at other axial locations within the trailing edge pedestal array. In other words, the redistribution region 80 may be located downstream of the first predominately linear row 78a of pedestals extending in the longitudinal direction. As an example, in one embodiment, there are at least 3 or 4 rows of staggered arced pedestals rows distributed downstream of the redistribution region 80.

Those skilled in the art will recognize, with the benefit of this disclosure, that this design requirement is to ensure an adequate flow development length in order to establish more uniformity and periodicity in the local flow vortices downstream of subsequent arced pedestal row features, prior to the cooling air being discharged through the arced trailing end 68b into the core gaspath. The flow uniformity along the arced trailing end 68b will ensure continuity in the longitudinal convective heat transfer and local thermal cooling effectiveness down stream of row 78f which is required to mitigate local oxidation and thermal mechanical fatigue (TMF) durability failure modes. Additionally the streamwise uniformity of cooling flow also mitigates large regions of flow separation that produce large flow recirculation eddies that may result in hot gas entrainment as well as induce regions large aerodynamic loss along the airfoil trailing end 68b adversely impact aerodynamic performance and efficiency.

Figure 5A:
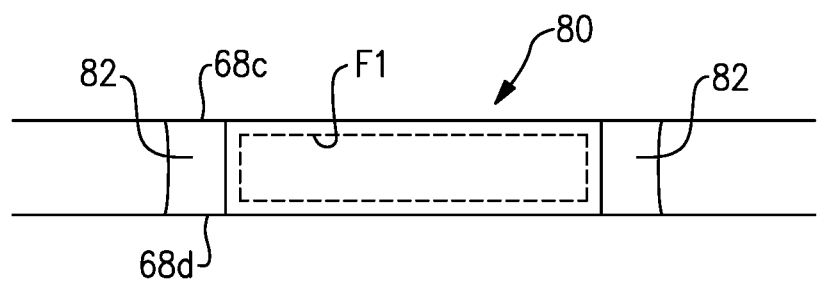
FIG. 5A illustrates a sectioned view through adjacent pedestals of a redistribution region of the airfoil of FIG. 4.

As shown in FIG. 5A, the distribution pedestals 82 in the redistribution region 80 are non-flow-metering pedestals. That is, the streamwise and longitudinal (or predominately lateral) spacing and size of the redistribution pedestals 82 do not restrict flow of the cooling air from the straight rows

78a/78b/78c/78d. For instance, FIG. 5A shows a sectioned view through a representative portion of the redistribution region 80 between two adjacent distribution pedestals 82. The redistribution pedestals 82 define a first intra-pedestal cross-sectional flow area F1. The first intra-pedestal cross-sectional flow area F1 is the cross-sectional area bound between two adjacent redistribution pedestals 82 and the first and second sides 68c/68d.

Figure 5B:
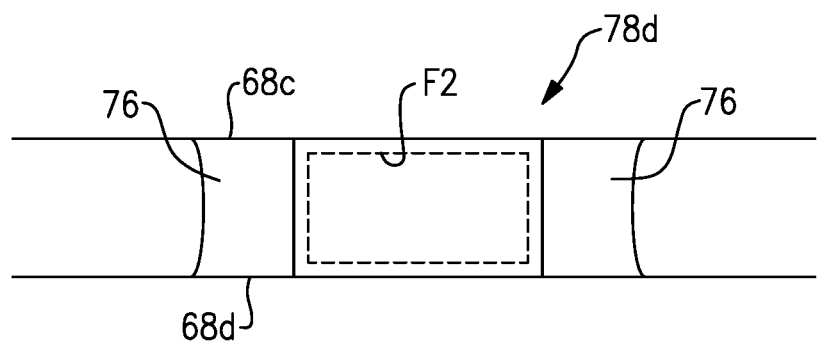
FIG. 5B illustrates a sectioned view through a portion of a straight row of pedestals of the airfoil of FIG. 4.

FIG. 5B shows a sectioned view through a representative one of the rows 78, here row 78d, between two adjacent pedestals 76. The pedestals 76 define a second intra-pedestal cross-sectional flow area F2. The second intra-pedestal cross-sectional flow area F2 is the cross-sectional area bound between two adjacent pedestals 76 in the same row 78 (here row 78d) and the first and second sides 68c/68d. As will be appreciated, each row 78a/78b/78c/78d will have an associated area F2. In one example, F2 is equal among the rows 78a/78b/78c/78d, but F2 may also vary by rows 78a/78b/78c/78d such that F2 decreases row-by-row in the aft direction. In this example, F1 is different than F2 and is greater than F2 of at least the adjacent row 78d. In a further example, F1 is greater than the F2 of each row 78a/78b/78c/78d.

The effect of F1 being greater than F2 is that the flow of cooling air from the rows 78a/78b/78c/78d into the redistribution region 80 is not restricted. In contrast, if F1 were less than F2, the smaller cross-sectional area F1 would serve as a constriction and limit (or meter) the flow. However, with F1 greater than F2, the larger cross-sectional area F1 does not significantly impede the cooling air flow and the cooling air can freely flow from the rows 78a/78b/78c/78d into the redistribution region 80. Thus, the redistribution region 80 serves as a transition from the straight rows 78a/78b/78c/78d to the arced rows 78e/78f, without tending to redistribute more of the cooling air toward the ends 68e/68f. Thus, the longitudinally oriented straight rows 78a/78b/78c/78d can precisely control the distribution of cooling air flow, while the redistribution region 80 enables the transition of the cooling air flow into the downstream arced rows 78e/78f for discharge through the arced trailing end 68b into the gaspath.

Figure 6:
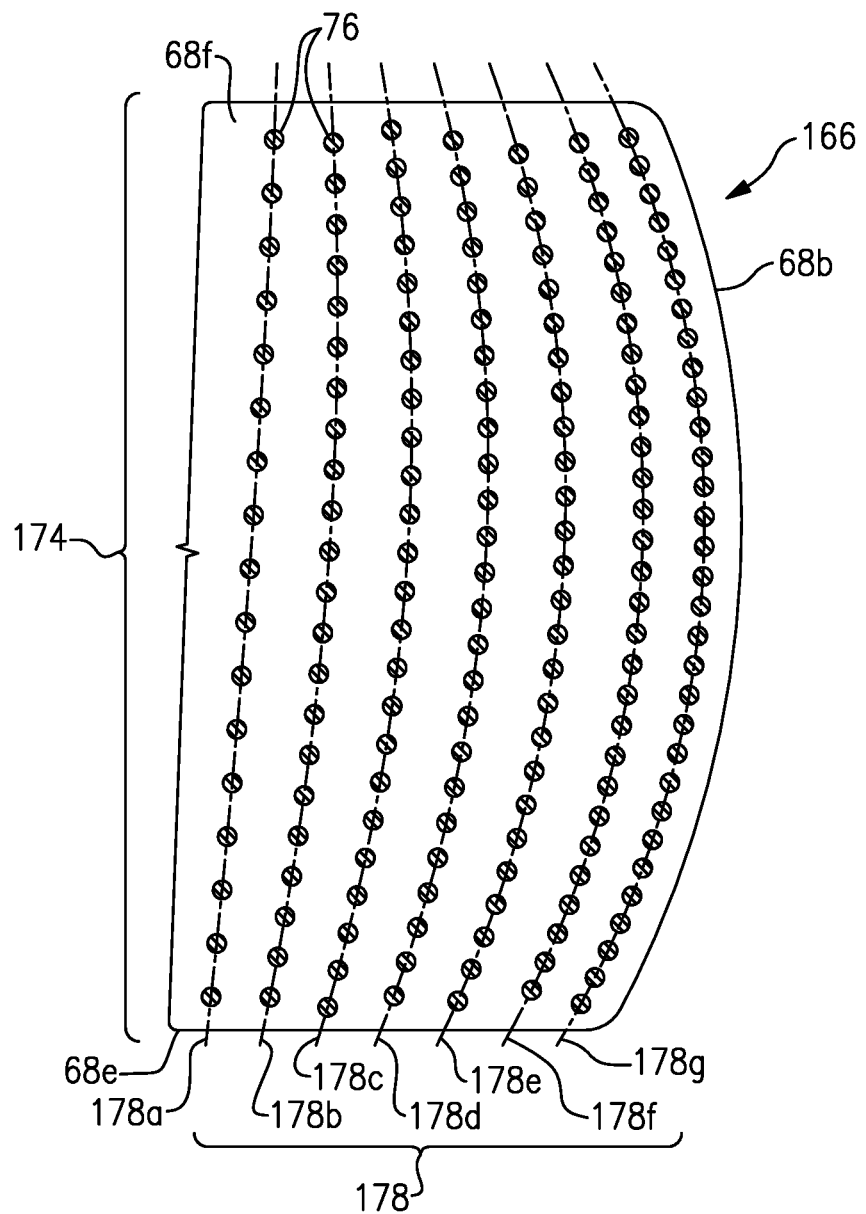
FIG. 6 illustrates another example airfoil section with at least one arced row of pedestals.

FIG. 6 illustrates another example airfoil section 166. In this disclosure, like reference numerals designate like elements where appropriate and reference numerals with the addition of one-hundred or multiples thereof designate modified elements that are understood to incorporate the same features and benefits of the corresponding elements. In this example, the airfoil section 166 includes an exit region 174 with pedestals 76 arranged in a plurality of longitudinal rows 178a/178b/178c/178d/178e/178f/178g (collectively rows 178).

In this example, row 178a is straight and rows 178b/178c/178d/178e/178f/178g are arced. The rows 178b/178c/178d/178e/178f/178g that are arced each have a radius of curvature, and the radii of curvature are unique. For instance, the unique radii of curvature decrease serially toward the trailing end 68b of the airfoil section 166. That is, the radii of curvature by row are 178b>178c>178d>178e>178f>178f. In a further example, the radii of curvature of the rows 178b/178c/178d/178e/178f/178g decrease serially by an equal increment toward the trailing end 68b of the airfoil section 166. For instance, if the radius of curvature of row 178b is 5.5 cm and the incremental change is 0.2 cm, the radius of curvature of row 178c would be 5.3, row 178d would be 5.1, row 178e would be 4.9, row 178f would be 4.7, and row 178g would be 4.5. The effect of the decreasing radii of curvature is also that the spacing between adjacent rows 78 is greatest at the mid-span and is least near the ends 68e/68f. In one additional example, the radius of curvature of the aft-most row, which here is row 178g, is congruent with the arced trailing end 68b. The radii of curvature of the rows 178b/178c/178d/178e/178f/178g thus progressively transitions from the straight row 178a to the arc shape of the arced trailing end 68b to evenly longitudinally distribute the cooling air.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having an airfoil wall defining a leading end, an arced trailing end, and first and second sides joining the leading end and the arced trailing end, the first and second sides spanning in a longitudinal direction between first and second ends, the airfoil wall circumscribing an internal core cavity, the internal core cavity including an exit region that spans between the first and second ends and that opens through the arced trailing end, the exit region including pedestals arranged in a plurality of longitudinal pedestal rows that extend from the first end to the second end, the pedestals within each of the longitudinal pedestal rows are equidistantly spaced apart, wherein at least one of the longitudinal pedestal rows is straight such that the pedestals are aligned along a straight line and at least one of the longitudinal pedestal rows is arced such that the pedestals are aligned along a continuous arc.

2. The airfoil as recited in claim 1, wherein the at least one of the longitudinal pedestal rows that is straight includes a plurality of longitudinal pedestal rows that are straight, and the at least one of the longitudinal pedestal rows that is arced includes a plurality of longitudinal pedestal rows that are arced.

3. The airfoil as recited in claim 2, further comprising a redistribution region including an array of redistribution region pedestals that define a first intra-pedestal cross-sectional flow area, the plurality of longitudinal pedestal rows that are straight defines a second intra-pedestal cross-sectional flow area that is different than the first intra-pedestal cross-sectional flow area.

4. The airfoil as recited in claim 3, wherein the first intra-pedestal cross-sectional flow area is greater than the second intra-pedestal cross-sectional flow area.

5. The airfoil as recited in claim 2, wherein the plurality of longitudinal pedestal rows that are arced have congruent radii of curvature.

6. The airfoil as recited in claim 1, wherein the at least one of the longitudinal pedestal rows that is arced includes a plurality of longitudinal pedestal rows that are arced, and the plurality of longitudinal pedestal rows that are arced each have a unique radius of curvature.

7. The airfoil as recited in claim 6, wherein the unique radii of curvature decrease serially toward the trailing end of the airfoil section.

8. The airfoil as recited in claim 7, wherein the unique radii of curvature decrease serially by an equal increment toward the trailing end of the airfoil section.

9. The airfoil as recited in claim 7, wherein an aft-most one of the longitudinal pedestal rows that are arced is congruent with the arced trailing end.

10. The airfoil as recited in claim 1, wherein the at least one of the longitudinal pedestal rows that is arced is congruent with the arced trailing end.

11. A gas turbine engine comprising:
a compressor section;
a combustor in fluid communication with the compressor section; and
a turbine section in fluid communication with the combustor,
the turbine section having a turbine airfoil that includes an airfoil section including an airfoil wall defining a leading end, an arced trailing end, and first and second sides joining the leading end and the arced trailing end, the first and second sides spanning in a longitudinal direction between first and second ends, the airfoil wall circumscribing an internal core cavity, the internal core cavity including an exit region that spans from the first and second ends and that opens through the arced trailing end, the exit region including pedestals arranged in a plurality of longitudinal pedestal rows that extend from the first end to the second end, the pedestals within each of the longitudinal pedestal rows are equidistantly spaced apart, wherein at least one of the longitudinal pedestal rows is straight such that the pedestals are aligned along a straight line and at least one of the longitudinal pedestal rows is arced such that the pedestals are aligned along a continuous arc.

12. An airfoil comprising:
an airfoil section having an airfoil wall defining a leading end, an arced trailing end, and first and second sides joining the leading end and the arced trailing end, the first and second sides spanning in a longitudinal direction between first and second ends, the airfoil wall circumscribing an internal core cavity, the internal core cavity including an exit region that spans from the first and second ends and that opens through the arced trailing end, the exit region including pedestals arranged in a plurality of longitudinal pedestal rows that extend from the first end to the second end, the plurality of longitudinal pedestal rows including at least one longitudinal pedestal row that is straight and an aft-most pedestal row that is arced and congruent with the arced trailing end.

13. The airfoil as recited in claim 12, wherein the plurality of longitudinal pedestal rows includes longitudinal pedestal rows that are arced, and the longitudinal pedestal rows that are arced each have a unique radius of curvature.

14. The airfoil as recited in claim 13, wherein the unique radii of curvature decrease serially toward the trailing end of the airfoil section.

15. The airfoil as recited in claim 13, further comprising a redistribution region including an array of redistribution region pedestals that define a first intra-pedestal cross-sectional flow area, the at least one longitudinal pedestal row that is straight defines a second intra-pedestal cross-sectional flow area that is different than the first intra-pedestal cross-sectional flow area.

16. The airfoil as recited in claim 15, wherein the airfoil section defines a span from the first end to the second end, and the redistribution region is within a middle 80% of the span.

17. The airfoil as recited in claim 16, wherein the first intra-pedestal cross-sectional flow area is greater than the second intra-pedestal cross-sectional flow area.

18. The airfoil as recited in claim 1, wherein the at least one of the longitudinal pedestal rows that is arced includes a plurality of longitudinal pedestal rows that are arced, and the pedestals of one of the longitudinal pedestal rows that are arced are longitudinally staggered with respect to the pedestals an adjacent one of the longitudinal pedestal rows that are arced.

19. The airfoil as recited in claim 18, wherein each of the plurality of longitudinal pedestal rows that are arced defines a pedestal row intra-pedestal cross-sectional flow area, and the pedestal row intra-pedestal cross-sectional flow area decreases row-by-row in an aft direction.

20. The airfoil as recited in claim 19, further comprising a redistribution region including an array of redistribution region pedestals that define a redistribution region pedestal intra-pedestal cross-sectional flow area, and the redistribution region pedestal intra-pedestal cross-sectional flow area is greater than the pedestal row intra-pedestal cross-sectional flow area.

* * * * *